Sept. 11, 1962 M. C. POOLE 3,052,932
MOBILE HOME
Filed Sept. 14, 1959 2 Sheets-Sheet 1

*INVENTOR.*
MYRON C. POOLE
BY
ATTORNEYS

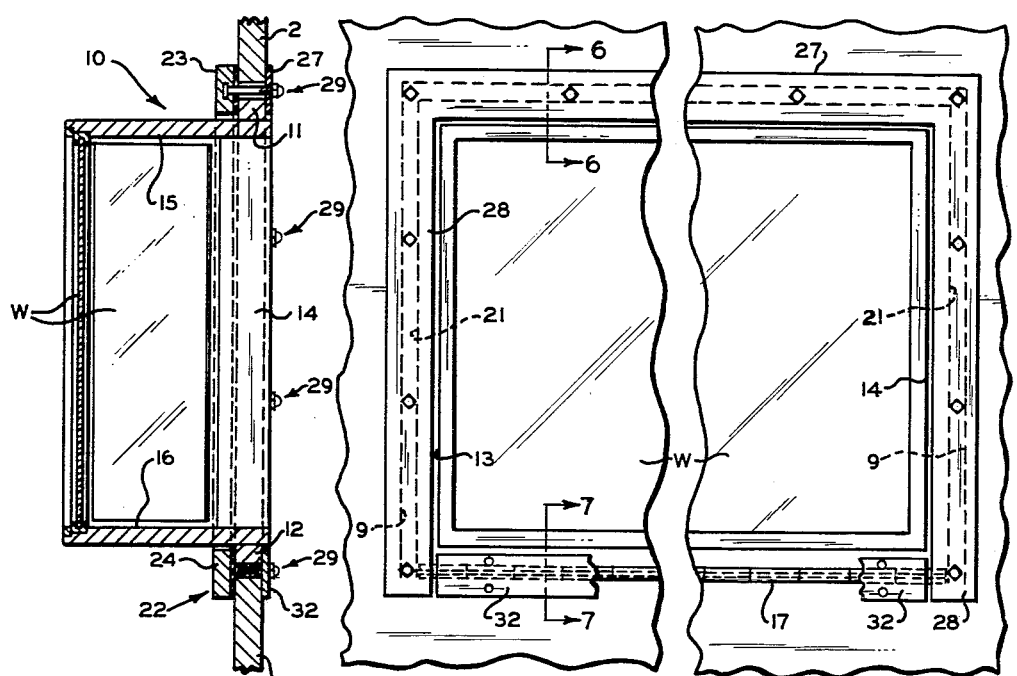

United States Patent Office 3,052,932
Patented Sept. 11, 1962

3,052,932
MOBILE HOME
Myron C. Poole, Elwood, Ind., assignor to Revolvex Corporation, Alexandria, Ind., a corporation of Indiana
Filed Sept. 14, 1959, Ser. No. 839,708
3 Claims. (Cl. 20—53)

This invention relates to mobile homes and more particularly to an adjustable bay window unit for mobile homes.

Mobile homes adapted to be driven over highways must not exceed ten feet in width under current highway laws of most jurisdictions. The ten feet width is an outside or overall measurement which means that the maximum possible interior width of a room is something less than ten feet. A room width of ten feet is, of course, rather narrow and is apt to give the room occupant a sense of being cramped. The cramped sensation can be alleviated to a considerable extent by the provision of bay window units which project outwardly from the vehicle body, and mobile homes equipped with bay window constructions of the kind disclosed in Patents Nos. 2,820,991 and 2,886,863 have enjoyed substantial consumer acceptance.

While the provision of outwardly projecting bay window units does much to prevent a cramped sensation, and actually increases the living area of a mobile home, it is essential that the window units be so constructed as to permit them to be retracted from their projected positions during transit of the home from place to place over the highways in order that the aforementioned highway laws shall not be violated. In the constructions disclosed in the above identified patents, the bay window units are adapted to be reversed during transit of the vehicle. That is, the bay window units are so designed as to be moved from positions in which they project outwardly of the vehicle body to positions in which they project inwardly of the body. While the prior constructions permit satisfactory results to be obtained, it has been found that substantially the same end result can be obtained by constructing a bay window unit in such manner that it is hingedly connected along one edge to the body wall of the vehicle so as to enable the window unit to be swung to and from a position in which it projects outwardly of the body. This construction has all the advantages of the earlier constructions, and, in addition, permits one person to convert the window unit with no tools other than a wrench or a pair of pliers.

An object of this invention is to provide a bay window construction for a mobile home and which is hingedly connected to a body wall of the home so as to be capable of being swung from a position in which it projects outwardly of the body wall to a position entirely within the body.

Another object of the invention is to provide a hinged bay window construction for mobile homes and which is equipped with effective sealing devices for preventing the entry of moisture, dust, and the like to the interior of the mobile home and which is so effective as to provide an airtight seal around the window unit when it is in its projected position.

Another object of the invention is to provide a bay window construction of the kind referred to including clamping devices which not only function to secure the window unit in projected position, but also are adapted to be used in clamping a cover or shield over the window opening when the window unit is in its retracted position.

A further object of the invention is to provide an adjustable bay window unit for a mobile home and which is so constructed and arranged as to permit its adjustment from projected to retracted positions, and return, quickly and easily by one person.

Other objects and advantages of the invention will be pointed out specifically or will become apparent from the following description when it is considered in conjunction with the appended claims and the accompanying drawings in which:

FIGURE 4 is an enlarged sectional view taken on the line 4—4 of FIGURE 3;

FIGURE 5 is a fragmentary view looking from right to left at FIGURE 4;

FIGURE 6 is an enlarged sectional view taken on the line 6—6 of FIGURE 5;

FIGURE 7 is a sectional view taken on the line 7—7 of FIGURE 5;

FIGURE 8 is a view similar to FIGURE 4, but showing the window unit swung to retracted position and the window opening covered by a shield member.

Figure 1:
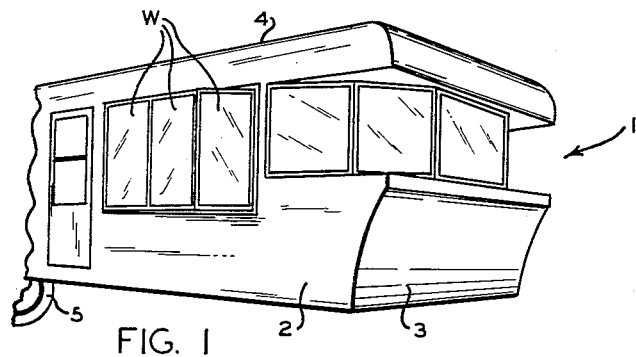
FIGURE 1 is a fragmentary, perspective view of a mobile home equipped with a bay window unit constructed in accordance with the invention, the window being shown in outwardly projecting position.
Figure 2:
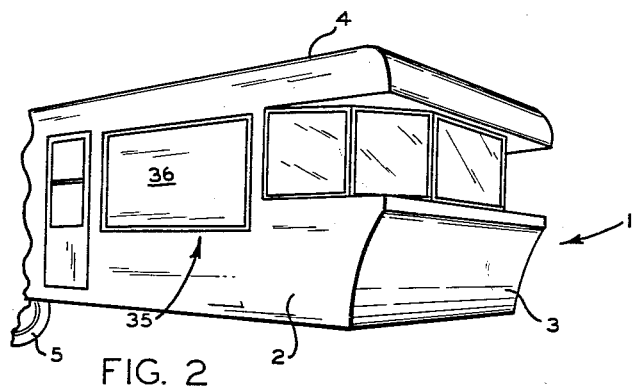
FIGURE 2 is a view similar to FIGURE 1, but illustrating the appearance of the home when the window unit is retracted and the window opening sealed for transit of the home along a highway.

Apparatus constructed in accordance with the invention is adapted for use in an otherwise conventional mobile home designated generally by the reference character 1 and which comprises side walls 2, end walls 3, a roof 4 and a floor (not shown), the entire assembly being mounted on wheels 5 in the conventional manner. Any of the side or end walls may be equipped with one or more window units formed according to the invention, but for purposes of illustration it may be assumed that the bay window units are provided only in the side walls 2.

Each side wall 2 is formed with an opening 6 (see FIGURE 8) which, in the illustrative embodiment of the invention, is rectangular but it will be understood that the opening may have other shapes if desired. The opening has an upper edge 7, a bottom edge 8 and two vertical side edges 9.

Figure 3:
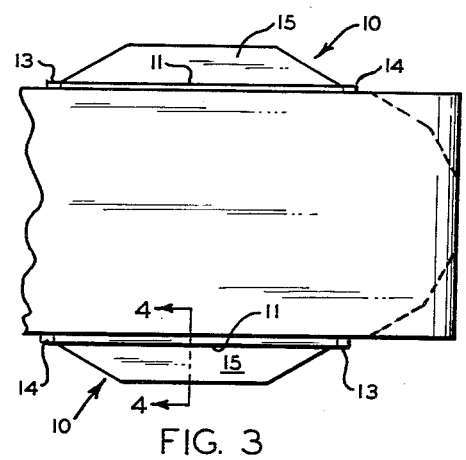
FIGURE 3 is a fragmentary, top plan view illustrating a pair of opposed bay window units, both of which project outwardly of the home body.
Figure 9:
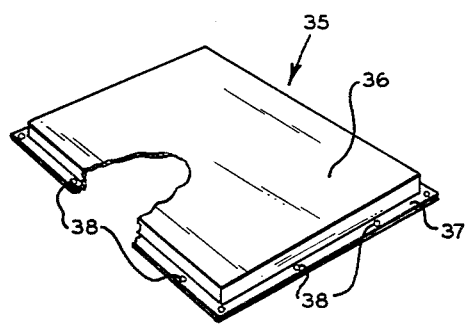
FIGURE 9 is a broken away, perspective view of the shield member.

A bay window unit designated generally by the reference character 10 comprises a marginal frame composed of upper and lower frame members 11 and 12 connected at corresponding ends to vertical frame members 13 and 14, the arrangement being such that the frame members form a frame corresponding to the shape of the opening 6, but the area of the frame is less than the area of the opening 6 for a purpose presently to be explained. Secured in any conventional manner to the upper and lower frame members 11 and 12, respectively, are an upper panel 15 and a lower panel 16 which, in plan, have the configuration of one-half a hexagon. See FIGURE 3. Between the panels 15 and 16 are mounted and secured three sash or the like units W which, together with the frame members and panels form the bay window unit.

In a preferred construction, the window unit 10 is hinged at its bottom edge for swinging movement into and out of the window opening 6, but it should be understood that the window may be hinged at any of its edges. Preferably, the hinge 17 is of the piano type having one leaf 18 secured by screws or the like to the wall 2 at the lower edge of the window opening 6 and having its hinge pin 19 located adjacent to the inner side of the wall 2. The other leaf 20 of the hinge may be secured by screws or the like to the lower frame member 12 of the bay window unit.

Due to the difference between the areas of the window opening 6 and the bay window frame, a space 20 will exist between the upper edge of the frame member 11 and the corresponding edge of the window opening when the window unit is assembled with the hinge 17 and is located in the opening 6. The space 20 should be of such size as to permit the bay window unit to be swung about the axis of the hinge pin 19 in a direction into the body of the vehicle without interference between the upper edge of the opening and any part of the bay window unit. Spaces 21 also exist between the sides of the unit and the window opening for a purpose to be pointed out subsequently.

When it is desired to locate the window unit 10 in its outwardly projecting position, the window unit may be swung about its hinge so as to occupy the window opening. Means for securing the window in its outwardly projecting position comprises an outer clamping frame 22 having a shape corresponding to the shape of the window frame elements 11—14 and being composed of upper and lower members 23, 24 connected at corresponding ends by vertical members 25. Each of the members 23—25 is of sufficient width to overlie both the adjacent window frame element and a portion of the vehicle wall 2 so as to span and completely close the spaces 20 and 21. The securing means for the window unit also includes a three-sided clamping frame member 26 having an upper member 27 and two vertical members 28, but having no attached bottom member. The members of the frame 26 are adapted to lie against the inner face of the wall 2 and are of such width as to span and close completely the upper space 20 and the vertical spaces 21.

The apparatus includes anchor means 29 for holding the members 22 and 26 in clamped, assembled relation with the wall 2 and the window unit 10 and such anchoring means comprises a plurality of threaded bolts 30 embedded or otherwise suitably secured at one end to the frame member 22 and being fitted at their other ends with removable bolts 31 which may be turned down against the adjacent frame member so as to draw the two clamp members 22 and 26 tightly against the adjacent edges of the body wall 2 and the bay window frame so as to clamp the latter securely in the window opening. If desired, a trim strip 32 may be provided at the inner side of the window unit and be secured to the wall by screws 33 or the like. The purpose of the trim strip is to conceal the hinge, but it is not necessary to the proper functioning of the apparatus.

In order to provide an effective seal for the bay window unit, each member of the clamping frame 22 may be provided with a gasket 34 formed of rubber, cork, or other suitable material, the arrangement being such that the gasket 34 will bear against the adjacent edges of both the body wall 2 and the window frame elements so as to provide a complete seal all around the window opening. If desired, similar gaskets may be associated with the inner clamp frame 26. In addition, it is desirable that the hinge leaves 18 and 20 each be provided with a sponge rubber or other suitable sealing member 34.

When a mobile home equipped with window units formed according to the invention is at the site of its intended use, the way window units will occupy the window openings in the vehicle body. When it is desired to move the home over the highway, however, it is necessary that the window units be shifted so that no part of the vehicle exceeds ten feet in width. This may be accomplished by removing the trim strip 32, removing the nuts 31, and by removing the clamping frames 22 and 26. The window unit 10 then may be swung about its hinge 17 into the vehicle body. If the bay window unit 10 does not extend all the way to the floor of the vehicle, it would be necessary to provide some support for the end of the unit which extends farthest into the vehicle. Such support may comprise a sawhorse or any other suitable supporting device or, if desired, the upper and inner edge of the window unit may be provided with folding legs (not shown) which may be received in recesses formed in the inner surface of the upper frame member 11. Such legs would be similar to card table legs and would be concealed by the clamp frame member 26 when not in use.

When the window unit has been swung to a retracted position, means must be provided to cover the opening 6 to prevent damage to the interior of the home. Such means may comprise a shield 35 having a main panel 36 formed of aluminum or the like with its edges flanged as at 37. The flanges may have openings 38 therein through which the bolts 29 may extend. The arrangement is such that the panel 35 may occupy completely the space between the outer clamping frame members whereas the flanges 37 may be overlapped by the frame members. When the shield has been fitted to the outer clamping frame, the latter may be replaced in the opening 6 and the inner clamping frame assembled therewith in the manner previously described. See FIGURE 8. When the clamping frames are in place, the shield will be held securely in position and it will be noted that the sealing gaskets 34 on the outer clamping frame once again serve to seal the window opening.

As is best indicated in FIGURE 5, the hinge 17 would interfere with the replacement of the inner clamping frame 26 when the window unit has been swung to its retracted position if the inner clamping had a lower frame member. It is for this reason that the inner clamping frame member is formed of only three sections.

The disclosed embodiment is representative of a presently preferred form of the invention, but is intended to be illustrative rather than definitive thereof. The invention is defined in the claims.

I claim:
1. A mobile home or the like construction including a body wall having inner and outer sides and provided with an opening therein; a bay window unit of such size relative to said opening as removably to fit therein; hinge means interconnecting one edge of said window unit and a corresponding edge of said wall at said opening and swingably mounting said window unit on said wall for swinging movements of said window unit into and out of said opening; releasable clamp means reacting between said wall and said window unit when the latter occupies said opening for releasably clamping said window unit in said opening; sealing means interposed between said one edge of said window unit and said corresponding edge of said wall for effecting a weathertight seal relationship therebetween, said sealing means being held in said relationship by said clamp means when said window unit is in said opening; additional sealing means disposed about the remaining edges of said opening in sealing relation with said window unit and maintained in said sealing relation by said clamp means; and an impervious shield member of such size as to be received in said opening when said window unit is swung out of said opening, said clamp means being operable to removably maintain said shield member in said opening.

2. A mobile home or the like construction including a body wall having inner and outer sides and provided with an opening therein; a bay window unit having a perimetric frame of less area than the area of said opening so as to fit within the latter and provide a space between said frame and the edges of said opening; hinge means mounted on corresponding edges of said frame and said wall at said opening and swingably mounting said window unit on said wall for swinging movements into and out of said opening; sealing means interposed between said corresponding edges and being compressed therebetween to effect a weathertight seal between said corresponding edges when said window unit is in said opening; first clamp means at one side of said wall and of such size as to overlie the space between said window unit and the edges of said opening when said window unit occupies said opening; second clamp means at the other side of said wall of such size as to overlie the space between said window unit and the edges of said opening when said window unit occupies said opening, except for the edge of the latter at which said hinge means is secured; means reacting between said first and second clamp means and lying in said space for releasably clamping said window unit in said opening, the clamping of said window unit in said opening maintaining said sealing means in compressed condition; and an impervious shield member of such size as to be received in said opening when said window unit is swung out of said opening, said clamp means being operable to removably maintain said shield member in said opening.

3. A mobile home or the like construction including a body wall having a polygonal opening therein; a bay window unit having a shape corresponding substantially to the shape of said opening and of such size as removably to fit within said opening; hinge means interconnecting one side of said wall at said opening and a corresponding side of said window unit and swingably mounting the latter on said wall for swinging movements into and out of said opening; sealing means interposed between said one side of said wall and said corresponding side of said window unit; a polygonal clamping frame having one less side than the number of sides of said opening and arranged to react between said wall and all sides of said window unit except said corresponding side when said window unit occupies said opening; releasable means reacting between said wall and all sides of said clamping frame and releasably clamping said window unit in said opening; and additional sealing means interposed between each side of said clamping frame and said wall, said sealing means and said additional sealing means being maintained in weather-tight sealing relationship by said releasable clamping means and said clamping frame when said window unit occupies said opening.

References Cited in the file of this patent
UNITED STATES PATENTS

| | | |
|---|---|---|
| 710,858 | Griesser | Oct. 7, 1902 |
| 2,150,280 | Killian | Mar. 14, 1939 |
| 2,886,863 | Poole | May 19, 1959 |
| 2,898,145 | Ferrera | Aug. 4, 1959 |